March 23, 1954     B. O. BENDTSEN     2,673,096
HITCH MECHANISM
Filed Jan. 10, 1951
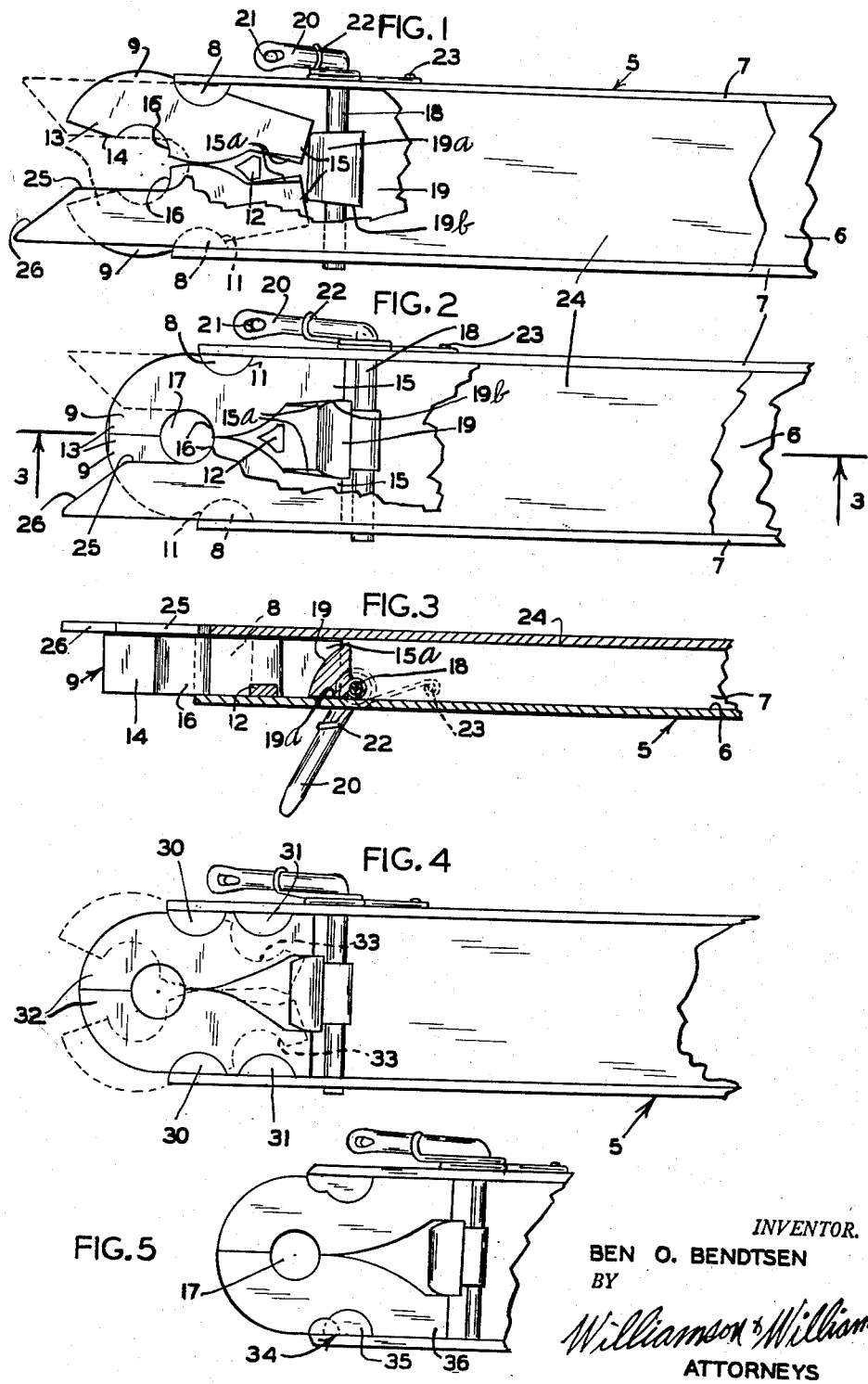
INVENTOR.
BEN O. BENDTSEN
BY
Williamson & Williamson
ATTORNEYS Patented Mar. 23, 1954

2,673,096

UNITED STATES PATENT OFFICE 2,673,096

HITCH MECHANISM

Ben O. Bendtsen, Rose Creek, Minn.

Application January 10, 1951, Serial No. 205,357

12 Claims. (Cl. 280—504)

This invention relates to hitch mechanisms.

More particularly, it relates to hitch mechanisms for tractors, balers, field harvesters, dump trucks or any other vehicle where a connection is to be made to facilitate the ready connection and disconnection with units of machinery to be drawn therebehind.

Hitch mechanisms previously known have proved unsatisfactory because of the short useful life-term of such devices. Most of these hitch mechanisms, if they are designed to permit connection and disconnection with the drawn unit without the operator's being compelled to dismount from the tractor, are provided with jaws pivoted upon a pair of spaced pivot pins. Such pivot pins are generally extended vertically between a pair of spaced plates with the jaws lying between the plates and supported only by pivot pins and a trip lever. During the use of such a hitch mechanism these pivot pins are subjected to extreme strains inasmuch as they are secured only at their extreme end portions and inasmuch as the continual side-whip normally associated with drawing a vehicle soon causes a slight amount of wear and associated play between the moving parts. Such slight play increases the rate of subsequent wearing, with the end result that the pivot pins shear within a relatively short time after the initial slight wear has taken place.

In addition to the above, an excess amount of material is required to construct such jaws with sufficient strength to withstand the strains to which they will be subjected because the passage of the pivot pins therethrough necessarily weakens their structure. To offset this weakening, the jaws must necessarily be made with a substantially greater width than would be required if the jaws were not penetrated by such pivot pins. My invention is directed toward the elimination of these unsatisfactory features, as will be hereinafter described.

It is a general object of my invention to provide a novel and improved hitch mechanism of cheap and simple construction and easy operation.

A more specific object is to provide a novel and improved hitch mechanism capable of being constructed with a minimum of material and with increased durability, compactness, and improved functions.

A still more specific object of my invention is to provide a hitch mechanism constructed with its pivot members disposed outside the jaws of the mechanism to avoid weakening of such jaws and to consequently increase the useful life term of the entire unit.

Another object is to provide a hitch mechanism which will insure maximum rigidity for its component parts to reduce wear of the same while in use to an absolute minimum.

Another object is to provide a hitch mechanism constructed to provide pivot elements fixedly secured throughout their lengths to enable them to withstand a maximum of stress at a given time and to withstand a maximum of wear over a prolonged period.

Another object is to provide a hitch mechanism capable of releasing a hitch pin despite the pull thereon being exerted at an angle with respect to the jaws of the hitch mechanism.

Another object is to provide a hitch mechanism for tractors and the like constructed to permit the tractor operator to release or engage the vehicle to be drawn therebehind without dismounting from the tractor and despite the angle at which the drawn vehicle may be oriented with respect to the tractor.

Another object is to provide a tractor hitch mechanism constructed to permit the tractor operator to release the vehicle drawn therebehind with a minimum of effort even though the vehicle being drawn is extremely heavy.

Another object is to provide a hitch mechanism constructed to compensate at all times for any slight wear which may have occurred in its component parts and to thereby hold such parts rigidly in place with respect to each other to obtain substantially the same effect as an integrally formed connection between the tractor and the machine being drawn.

A further object is to provide a hitch mechanism which does not depend solely upon its pivot elements for support of the pulling strength.

These and other objects and advantages of the invention will more fully appear from the following description, made in connection with the accompanying drawings, wherein like reference characters refer to the same or similar parts throughout the several views, and in which Fig. 1 is a top plan view of one embodiment of my invention in open position with portions of the upper plate thereof broken away to show the interior component parts;

Fig. 2 is a top plan view of the same in closed position;

Fig. 3 is a longitudinal vertical sectional view taken along line 3—3 of Fig. 2; and Fig. 4 is a top plan view of a second embodiment of my invention with a portion of the upper plate broken away to show the interior thereof; and Fig. 5 is a top plan view of a third embodiment of my invention with a portion of the upper plate broken away to show the interior thereof.

One embodiment of my invention may include, as shown in Figs. 1–3, a channel member indicated generally as 5 having a bottom wall 6 and a pair of spaced vertical upright walls 7. Mounted at one end of the channel member 5 and within the channel thereof is a pair of oppositely positioned pivot shoulders 8 which are fixedly secured to the inner side of the side walls 7. These pivot shoulders 8 extend vertically and are substantially semi-circular in horizontal cross section. They may be welded or integrally formed with the side walls 7 and are also welded or integrally formed with the bottom wall 6.

Mounted between the pivot shoulders 8 in close proximity to each other is a pair of generally S-shaped jaws 9. These jaws 9 extend both rearwardly and forwardly with respect to the pivot shoulders 8 as shown in Figs. 1–3 and are of substantially the same depth as the pivot shoulders are in length. In width, the jaws 9 are substantially equal to the diameter of the pivot shoulders 8 and they are substantially uniform in width throughout their entire length.

Formed in the outer side of each of the jaws 9 is a recess 11 of dimensions and shape sufficient to complement and receive therein one of the pivot shoulders 8. Thus, each of the jaws 9 is mounted on a pivot shoulder 8 for free but limited pivotal movement thereby, the side walls 7 restricting such movement in part. A stop element 12 which extends upwardly from the medial portion of the bottom plate 6 also serves to limit such pivotal movement. This pivotal movement permits the jaws 9 to move from open to closed position and vice versa.

The rearwardly extending portions 13 of the jaws 9 have flat oppositely facing surfaces 14 which register with each other when the jaws are in closed position. The forwardly extending portions 15 of the jaws 9 are shaped so as to be spaced with relation to each other when the jaws are in closed position. The inner and opposite surfaces 15a of these portions taper inwardly and rearwardly as best shown in Fig. 1. Each of the rearwardly extending portions 13 has a recess 16 formed within its inner surface to provide a hole 17 opening upwardly and downwardly to receive therein a hitch pin (not shown).

Extending transversely of the channel member 5 through apertures provided therefor in the side walls 7 is a pivot rod 18 which has mounted thereon at its medial portion a latch element 19. Attached to one of the outer ends of the pivot rod 18 is a lever arm 20 with an eye 21 at its outer end. Mounted on the lever arm 20 is a spring 22, one end of which is secured to the lever arm and the other end of which is hooked over an anchor pin 23 so as to constantly urge the lever arm rearwardly. The latch element 19 is thus mounted for pivotal movement to move inwardly between the two forwardly extending portions 15 of the jaws 9 to maintain these portions in spaced relation with each other. It is also pivoted to permit this latch element to be withdrawn from between these forwardly extending portions and to thereby permit the jaws 9 to move to open position. This latch element 19 has a flat surface 19a which faces rearwardly when the latch element is shifted to a position out of the space existing between the forwardly extending portions 15. The opposite sides 19b of the latch element 19 also taper in a manner similar to the tapering of the inner side surfaces 15a. The width of the rearwardly facing surface 19a is substantially equal to the spacing between the inner surfaces of the forwardly extending portions 15 when the jaws 9 are in open position.

As shown in Fig. 1 a top plate 24 is welded to the channel member 5 directly above the pivot shoulders 8 to form what is substantially a rectangularly shaped tubular member. As shown, this top plate 24 extends rearwardly beyond the pivot shoulders and beyond the forward ends of the jaws 9. A longitudinal slot 25 is formed in the top plate 24 and extends forwardly from the rearward edge thereof to a point directly above the front wall 16a which outlines the hole 17. The rearwardmost portion of the top plate 24 adjacent the slot 25 is flared as at 26.

Fig. 4 shows a second embodiment of my invention wherein the structure and operation of the device is substantially the same. However, in addition to the pivot shoulders 30 I have provided a pair of oppositely positioned anchor posts 31 which are similar in shape to the pivot elements 30 and are welded or integrally formed with the side walls of the channel member. The jaws 32 are each provided with a recess 33 in their outer side to accommodate the anchor posts 31 in close fitting relationship. Except for this variation, the two structures revealed in Figs. 1–3 and in Fig. 4 are substantially the same.

Fig. 5 shows a third embodiment of my invention wherein the structure and operation of the device are substantially the same with the exception that the pivot shoulder and anchor post are combined. This combined pivot shoulder and anchor post indicated as 34 in Fig. 5 is shaped to resemble the merging of a semi-cylinder of relatively small diameter as outlined with the broken lines and a larger semi-cylinder indicated as 35. Thus, the pivot point of the dogs 36 is the center of the smaller cylinder, while the combined small and large cylinder act as an anchor post to withstand the pulling force exerted thereagainst.

In operation, my hitch mechanism is, of course, rigidly secured to the drawbar of the tractor. Prior to hitching a machine behind the tractor, the jaws of the hitch mechanism must be moved to open position. To accomplish this the operator pulls a string or cable (not shown) connected to the eye 21 which causes the pivot rod 18 to pivot and move the latch element 19 out of the space between the forwardly extending portions 15 of the jaws 9. The jaws 9 are then manually moved to open position, whereupon the arm 20 is released and the rearwardly facing surface 19a will be permitted to abut against the rear ends of the jaws 9 to hold the same in open position. The constant pressure of the spring 22 will urge the latch element 19 constantly against the forward ends of these jaws to maintain them in open position until a stronger force causes them to move to closed position. This position is best shown in Fig. 1.

The hitch mechanism is now in position for the operator of the tractor to connect the vehicle to be drawn to the tractor without dismounting therefrom. To accomplish this, he merely backs the tractor so that the latch pin of the vehicle to be drawn enters the flared slot 25 of the top plate 24. The flared sides of this slot will guide the latch pin until it strikes the front wall of the hole 16. The pressure caused by the latch pin upon this front wall will cause the jaws 9 to pivot so that their rearwardly extending portions 13 will engage each other and so that the forwardly extending portions 15 will separate to a position sufficient to permit the latch element 19 to pivot and enter the space therebetween. The spring 22, of course, will urge the latch element between these forwardly extending portions, causing the jaws 9 to be locked in closed position.

To release the vehicle, the operator of the tractor need only to pull the cable attached to the lever arm 20 by means of the eye 21 to in turn cause the pivot rod 18 to pivot and withdraw the latch element 19 from the space between the forwardly extending portions 15. As he does this, the rearward pull on the latch pin by the machine being drawn will cause the rearwardly extending portions of the jaws 9 to separate and move to open position. By releasing the arm 20, the spring will again cause the latch element to bear against the forward ends of the jaws 9 and maintain them in this open position preparatory to a subsequent attachment to another vehicle to be drawn.

One of the advantages of my hitch mechanism is that the pivot shoulders are disposed outside the body of the jaws so as to enable the manufacturer to construct these jaws of sufficient strength without utilizing an objectionable amount of material therefor. By positioning my pivot element outside the body of the jaws 9, I have not weakened the structure of these jaws as is the case when the pivot element pierces the body of the jaw. Thus, it is possible to obtain a maximum amount of strength with a minimum amount of material and to increase the compactability of the entire unit. The S-shape of the jaws 9 permits this to be accomplished and at the same time permits the jaws to be made uniformly as to both width and depth. Thus, the jaws utilized in my invention are of substantially the same width and depth throughout their entire length and contain no relatively weak portions such as is the case where the body of the jaw is pierced by the pivot element.

Another advantage of my hitch mechanism is that I have eliminated the undesirable results normally achieved in hitch mechanisms of other construction as a result of the side-whip to which these hitch mechanisms are subjected while drawing vehicles therebehind. By providing rigid side walls 7 and by providing tapered walls on the forwardly extending portions 15 and complementary tapering walls on the latch element 19, I have insured that the component parts, namely, the pivotable jaws, will at all times be maintained in a substantially rigid position so as to obtain the overall effect of an integrally formed connection. Any slight wear which might take place is at all times immediately compensated for by the tapering walls of the latch element 19, for as this wear takes place the latch element will progressively move farther inward to insure that the forwardly extending portions 15 constantly register with the side walls 7 while the jaws are in closed position. Thus, the magnifying effects of the side-whip to which these hitch mechanisms are subjected is substantially eliminated, even though a very slight amount of wear might take place.

Another important feature of my device is that I have provided added strength in the way of pivot elements by securing my pivot shoulders 8 to the side walls 7 throughout their entire length and by securing their lower ends to the bottom plate 6. It can be readily seen that by so doing, I have increased the ability of these pivot elements to withstand wear and to substantially reduce the tendency to shear as a result of a slight amount of wear. Thus, I have substantially increased the useful life term of the entire unit for the pivot element in such a construction must necessarily withstand the rearwardly directed force exerted by the machine being drawn. If it is considered desirable, it is possible to increase the amount of such force which may be withstood by the jaws 9 by providing additional anchor posts such as the anchor posts 31 shown in Fig. 4. I have not found this to be necessary, however, inasmuch as the pivot shoulders 8 have proved more than adequate for this purpose. The structure disclosed in Fig. 5 shows another method of providing increased resistance to the pulling force exerted on the hitch mechanism. It can be seen by referring to Fig. 5 that the jaws 36 pivot around the center of the smaller semi-cylinder, while the larger semi-cylinder provides increased strength to prevent the dogs 36 from shearing the pivot pin. At the same time, this permits the hole 17 to be positioned farther forwardly between the pivot points and thus facilitates the easy removal of the latch element which is positioned between the forwardly extending portions of the dogs 36.

It should be noted that the hole 17 formed by the recesses in the jaws 9 is positioned sufficiently forwardly so that the forward wall 16a intersects a line drawn between the rearwardmost portions of the pivot shoulders 8. This forward positioning of the hole 17 is very important with regard to the amount of force required to withdraw the latch element 19 when a heavy load is being drawn behind the tractor. It can be readily seen that by positioning the hole 17 as far forwardly as possible with respect to the pivot shoulders 8, that a minimum of leverage is provided to exert an inward pressure through the forwardly extending portions 15. If the hole 17 is positioned farther rearwardly, the amount of leverage is increased so that the jaws 9 are more apt to be sprung and to spread and a greater amount of effort will be required to remove the latch element 19 to free a heavy load. It is extremely difficult to free such a heavy load when the hole 17 is positioned farther rearwardly with respect to the pivot shoulders 8.

It should be noted also that the top plate 24 with the flared slot 25 formed therein facilitates the release of the latch pin on a heavily loaded vehicle even though the tractor is pulling at an angle to the direction in which the drawn vehicle is facing. Hitch mechanisms previously known are inadequate in this respect in that the latch pin would catch on the rearwardmost portion of the jaws when the tractor was drawn forwardly at an angle to the drawn vehicle. The slot 25 of the top plate 24 prevents the latch pin from engaging the corner of the jaw 9, since the slot will prevent the latch pin from coming in contact with that corner when the jaw is in open position. This can best be seen in Fig. 1.

Thus, it can be seen that I have provided a tractor hitch mechanism which is capable of being constructed with a minimum of material and with increased durability, compactness and improved functioning.

It will, of course, be understood that various changes may be made in the form, details, arrangement and proportions of the various parts without departure from the scope of the present invention, which, generally stated, consists in the matter shown, and described, and set forth in the appended claims.

What I claim is:

1. In a hitch mechanism, a channel member having opposed side walls, a pair of pivot members mounted on said walls within said channel member adjacent one of its ends and extending inwardly therefrom, a pair of detached jaws mounted between said pivot members in close proximity with each other and extending rearwardly and forwardly with respect thereto, each of said jaws having a recess formed in its periphery to receive one of said pivot members therein for free but limited pivotal movement therebetween and being otherwise disconnected from said channel member, said jaws being adapted to be opened and closed as a result of such pivotal movement and being shaped so as to engage each other by their rearwardly extending portions when in closed position with a hole between them opening upwardly and downwardly for the reception of a hitch pin and being shaped so that their forwardly extending portions are spaced from each other when the rearwardly extending portions engage each other, and a movable latching element carried by said channel member and adapted to be moved into the space between the forwardly extending portions of said jaws in tight-fitting relationship to maintain the rearwardly extending portions of said jaws in engaging position and adapted to be moved out of such space as desired to permit said jaws to open.

2. The structure defined in claim 1, said hole being disposed sufficiently forwardly to intersect a line drawn between the rearwardmost portions of said pivot members to thereby reduce to a minimum the effort required to move said latching element out of such space while a heavy load is being drawn by said jaw members.

3. In a hitch mechanism, a channel member having a pair of spaced upright side walls having surfaces facing toward each other, a pair of pivot shoulders each mounted within said channel member at one of its ends and upon said surfaces of said channel member and extending inwardly therefrom, a pair of opposed and detached jaws disposed between said pivot shoulders and each having a recess formed in its periphery most remote from the other intermediate its ends and receiving one of said pivot shoulders within said recess and pivoting thereabout in continuously registering relation therewith, said jaws extending rearwardly and forwardly with respect to said pivot shoulders and being adapted to be opened and closed as a result of said pivoting and, when closed, to engage each other with a hole between them opening upwardly and downwardly for the reception of a hitch pin, said jaws being shaped so that when the rearwardly extending portions of the jaws engage each other the forwardly extending portions will be spaced from each other, means connected to said channel member retaining said jaws within said channel member, and a movable latching member carried by said channel member and adapted to be moved into the space between the forwardly extending portions of said jaws in engaging position and to be moved out of such space as desired to permit said jaws to open.

4. In a hitch mechanism, a channel member having opposed side walls, a pair of opposed pivot elements carried by said walls adjacent one of the ends of said channel member and extending inwardly therefrom, a pair of detached jaws mounted between said pivot elements in close proximity with each other and extending rearwardly and forwardly with respect to said pivot elements, each of said jaws having a cooperating pivot element carried on its outer side to cooperate with one of said first mentioned pivot elements for free pivotal movement therebetween, said jaws being adapted to be opened and closed as a result of such pivotal movement and being shaped so as to engage each other by their rearwardly extending portions when in closed position with a hole between them opening upwardly and downwardly for the reception of a hitch pin and being shaped so that their forwardly extending portions are spaced from each other when the rearwardly extending portions engage each other, and a movable latching element carried by said channel member forwardly of the forwardly extending portions of said jaws and resiliently urged so as to be moved into the space between the forwardly extending portions of said jaws in tight-fitting relationship to maintain the rearwardly extending portions of said jaws in engaging position and adapted to be moved out of such space as desired to permit said jaws to open.

5. In a hitch mechanism, a channel member having opposed side walls, a pair of vertically extending pivot elements of generally semi-circular cross sectional shape mounted on said walls within said channel member adjacent one of its ends and extending inwardly therefrom, a pair of detached generally S-shaped jaws mounted between said pivot elements in close proximity with each other and extending rearwardly and forwardly with respect to said pivot elements, said jaws being of substantially the same thickness throughout their length and each being of a width substantially equal throughout to the diameter of said pivot elements and each having a recess formed in its periphery to receive one of said pivot elements therein for free pivotal movement therebetween and being otherwise disconnected from said channel member, said jaws being adapted to be opened and closed as a result of such pivotal movement and being shaped so as to engage each other by their rearwardly extending portions when in closed position with a hole between them opening upwardly and downwardly for the reception of a hitch pin and being shaped so that their forwardly extending portions are spaced from each other when the rearwardly extending portions engage each other, and a movable latching element carried by said channel member and adapted to be moved into the space between the forwardly extending portions of said jaws in tight-fitting relationship to maintain the rearwardly extending portions of said jaws in engaging position and adapted to be moved out of such space as desired to permit said jaws to open.

6. In a hitch mechanism, a channel member having opposed side walls, a pair of pivot elements mounted on said walls within said channel adjacent one of its ends, at least one pair of opposed anchor elements fixedly secured to said walls forwardly of said pivot elements, a pair of detached jaws mounted between said pivot elements in close proximity with each other and extending rearwardly and forwardly with respect to said pivot elements and between said anchor elements, each of said jaws having a recess formed in its periphery to receive one of said pivot elements therein for free pivotal movement therebetween and having a second recess formed in its periphery forwardly of said first mentioned recess in position to receive one of said anchor elements therein in tight-fitting relation and being otherwise disconnected from said channel member, said jaws being adapted to be opened and closed as a result of such pivotal movement and being shaped so as to engage each other by their rearwardly extending portions when in closed position with a hole between them opening upwardly and downwardly for the reception of a hitch pin and being shaped so that their forwardly extending portions are spaced from each other when the rearwardly extending portions engage each other, means connected to said channel member retaining said jaws within said channel member, and a movable latching element carried by said channel member and adapted to be moved into the space between the forwardly extending portions of said jaws in tight-fitting relationship to maintain the rearwardly extending portions of said jaws in engaging position and adapted to be moved out of such space as desired to permit said jaws to open.

7. In a hitch mechanism, a tubular member of generally rectangular cross sectional shape having an upper and a lower side, a pair of pivot elements fixedly secured throughout their length to the opposite inner sides of said tubular member adjacent one of its ends and fixedly secured to said upper and lower side, a pair of separate and detached jaws mounted between said pivot elements and within said tubular member in close proximity with each other and extending rearwardly and forwardly with respect to said pivot elements, each of said jaws having a recess formed in its periphery to receive one of said pivot elements therein for free pivotal and continuously registering movement therebetween and being otherwise disconnected from said tubular member, said jaws being adapted to be opened and closed as a result of such pivotal movement and being shaped so as to engage each other by their rearwardly extending portions when in closed position with a hole between them opening upwardly and downwardly for the reception of a hitch pin and being shaped so that their forwardly extending portions are spaced from each other when the rearwardly extending portions engage each other, and a movable latching element carried by said tubular member forwardly and between the forwardly extending portions of said jaws and adapted to be moved into the space between the forwardly extending portions of said jaws in tight-fitting relationship to maintain the rearwardly extending portions of said jaws in engaging position and adapted to be moved out of such space as desired to permit said jaws to open, at least one of said upper and lower sides of said tubular member being extended rearwardly beyond said hole and having a longitudinal slot formed therein and extending forwardly from the rearward end thereof to a point at least opposite the forwardmost wall of said hole, the width of said slot being substantially equal to the diameter of said hole whereby the release of a hitch pin from said jaws when the latter are moved to open position may be facilitated despite the outward pull exerted on such hitch pin being exerted in a direction other than longitudinally of said jaws.

8. In a hitch mechanism, a channel member having opposed side walls, a pair of jaws mounted within said channel members and extending rearwardly therefrom in close proximity to each other in position to cooperate to engage the hitch pin of the vehicle to be drawn, at least one pivot member mounted on one of the side walls of said channel member adjacent one of its ends and extending inwardly therefrom toward the opposite side wall, at least one of said jaws having a recess formed in its periphery and receiving said pivot member therein and pivoting limitedly therearound while at all times remaining in snug fitting relation therewith, said pivoting jaw member being otherwise disconnected from said channel member and being movable to open and closed position relative to said other jaw and being shaped so as to engage said other jaw when in closed position with a space between their medial portions for the reception of a hitch pin therein, and a movable latching element carried by said channel member in position to latch said pivotable jaw in closed position when desired.

9. In a hitch mechanism wherein pivotable jaw members are utilized to engage the hitch pin of the vehicle to be drawn and wherein locking means is utilized for locking such jaw members in hitch-pin engaging position, a channel member having opposed side walls adapted to receive such jaw members therebetween, and at least one pivot shoulder mounted within said channel member adjacent one of its end portions and against one of said side walls, said pivot shoulder extending inwardly toward the opposite side wall and having its inner surface arcuately shaped to adapt the same to have one of such jaw members pivot therearound in continuous snug fitting relation with only its periphery in registry therewith.

10. In a hitch mechanism wherein jaw elements pivotable about pivot shoulders mounted within a channel member are utilized to engage the hitch pin of a vehicle to be drawn and wherein locking means is utilized for locking such jaw elements in hitch-pin engaging position, an elongated jaw member adapted to be mounted within such a channel member and having an outer side and an inner side when so mounted, said jaw member having an arcuately shaped open recess formed in its outer side intermediate its ends, said recess being adapted to receive such a pivot shoulder therewithin and to pivot thereabout in continuously snug-fitting relation when said jaw member is moved to hitch-pin engaging position.

11. In a hitch mechanism, a member having opposed spaced walls, a pair of vertically extending pivot elements of generally semi-circular cross-sectional shape mounted on said walls within said member adjacent one of its ends and extending inwardly therefrom, a pair of detached jaws mounted between said pivot elements in close proximity with each other and extending rearwardly and forwardly with respect to said pivot elements, said jaws each having a recess formed in its periphery to receive one of said pivot elements therein for free pivotal movement therebetween and otherwise being disconnected from said member, said jaws being adapted to be opened and closed as a result of such pivotal movement and being shaped so as to abut each other by their rearwardly extending portions when in closed position with a hole between them opening upwardly and downwardly for the reception of a hitch pin and being shaped so that their forwardly extending portions are spaced from each other when the rearwardly extending portions engage each other, and a movable latching element carried by said member and adapted to be moved into the space between the forwardly extending portions of said jaws in tight fitting relationship to maintain the rearwardly extending portions of said jaws in engaging position and adapted to be moved out of such space as desired to permit said jaws to open.

12. In a hitch mechanism, a member having opposed spaced walls, a pair of vertically extending pivot elements of generally semi-circular cross-sectional shape mounted on said walls within said member adjacent one of its ends and extending inwardly therefrom, a pair of detached jaws mounted between said pivot elements in close proximity with each other and extending rearwardly and forwardly with respect to said pivot elements, said jaws each having a recess formed in its periphery to receive one of said pivot elements therein for free pivotal movement therebetween and otherwise being disconnected from said member, said jaws being adapted to be opened and closed as a result of such pivotal movement and being shaped so as to abut each other by their rearwardly extending portions when in closed position with a hole between them opening upwardly and downwardly for the reception of a hitch pin and being shaped so that their forwardly extending portions are spaced from each other when the rearwardly extending portions engage each other, and a movable latching element carried by said member and adapted to be moved into the space between the forwardly extending portions of said jaws in tight fitting relationship to maintain the rearwardly extending portions of said jaws in engaging position and adapted to be moved out of such space as desired to permit said jaws to open, and means for retaining said jaws from disengagement from the pivot elements in said member.

BEN O. BENDTSEN.

References Cited in the file of this patent

UNITED STATES PATENTS

| Number | Name | Date |
|---|---|---|
| 776,292 | Buller | Nov. 29, 1904 |
| 844,522 | Johnson | Feb. 19, 1907 |
| 1,321,519 | Geiger | Nov. 11, 1919 |
| 1,565,112 | Sommer | Dec. 8, 1925 |
| 1,978,859 | Draeger | Oct. 30, 1934 |
| 2,472,432 | McCune | June 7, 1949 |
| 2,521,132 | Smith | Sept. 5, 1950 |